No. 734,207. PATENTED JULY 21, 1903.
W. H. WENDELER.
BRAKE MECHANISM.
APPLICATION FILED APR. 2, 1903.
NO MODEL. 3 SHEETS—SHEET 1.

Witnesses
W. A. Alexander
C. C. Russell

Inventor
W. H. Wendeler
By Attorneys
Fowler & Bryson

No. 734,207. PATENTED JULY 21, 1903.
W. H. WENDELER.
BRAKE MECHANISM.
APPLICATION FILED APR. 2, 1903.
NO MODEL. 3 SHEETS—SHEET 2.
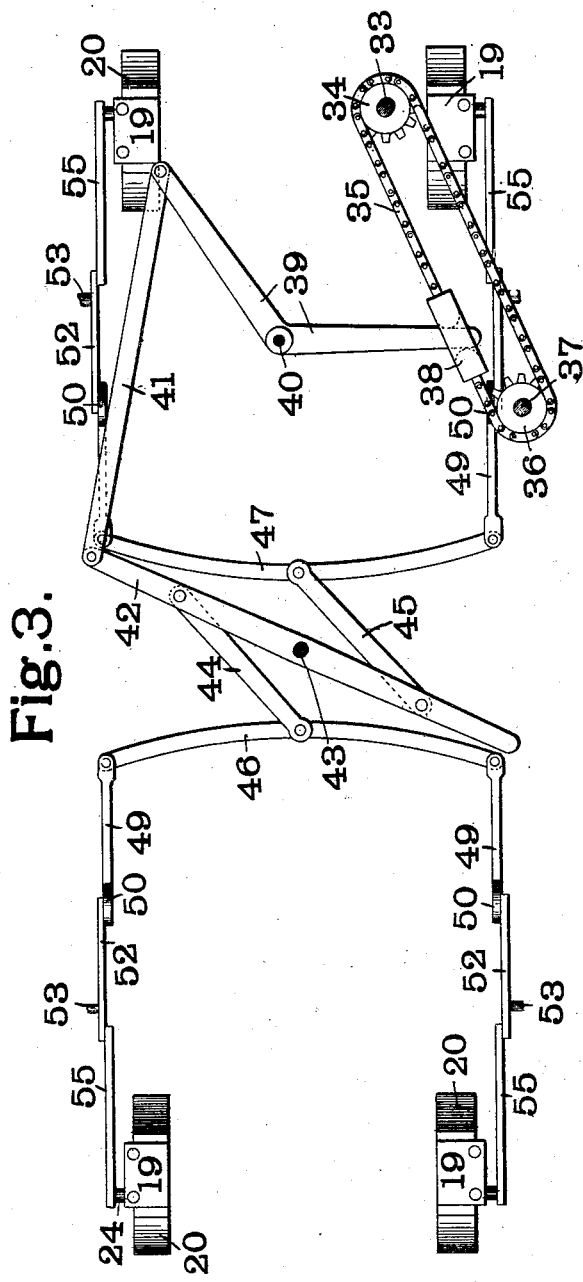
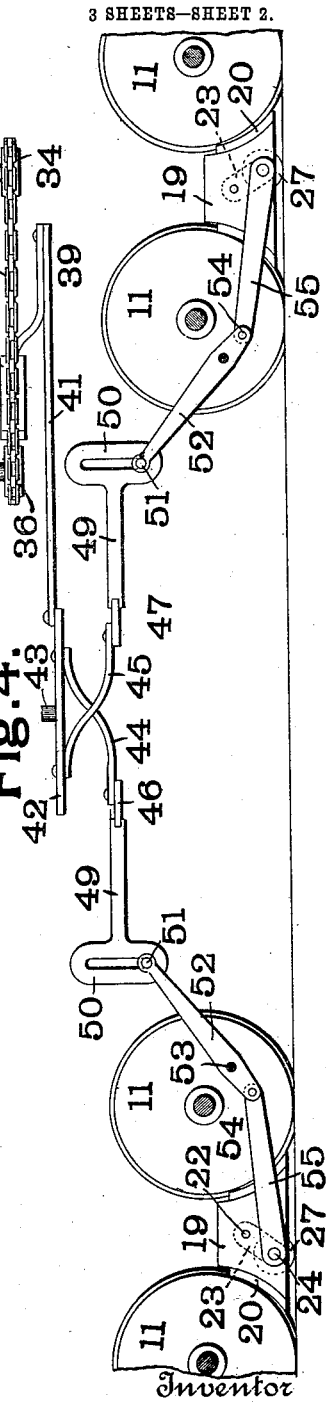
Witnesses
W. H. Alexander
Russell
Inventor
W. H. Wendeler
By Attorneys Fowler & Bryant

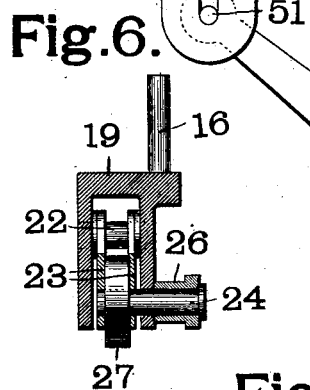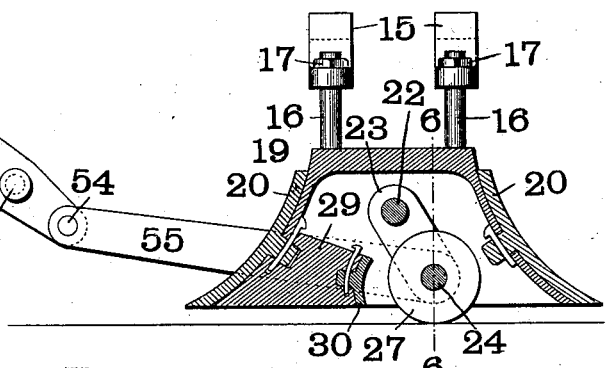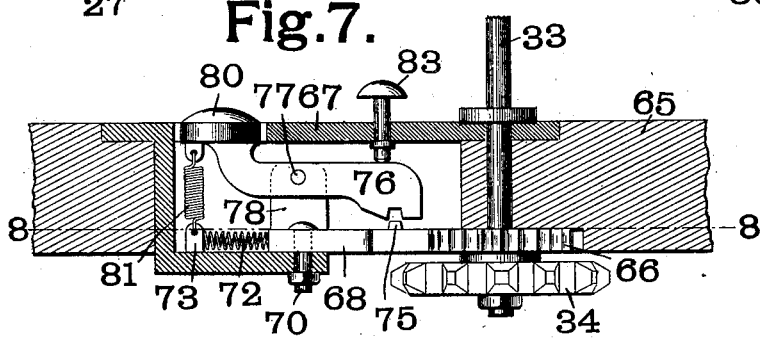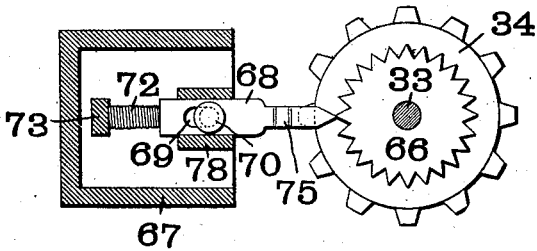

No. 734,207. Patented July 21, 1903.

UNITED STATES PATENT OFFICE.

WILLIAM H. WENDELER, OF ST. LOUIS, MISSOURI.

BRAKE MECHANISM.

SPECIFICATION forming part of Letters Patent No. 734,207, dated July 21, 1903.

Application filed April 2, 1903. Serial No. 150,790. (No model.)

*To all whom it may concern:*

Be it known that I, WILLIAM H. WENDELER, a citizen of the United States, residing at the city of St. Louis, in the State of Missouri, have invented a certain new and useful Brake Mechanism, of which the following is such a full, clear, and exact description as will enable any one skilled in the art to which it appertains to make and use the same, reference being had to the accompanying drawings, forming a part of this specification.

My invention relates more particularly to a brake for railway-cars which is simple in construction and effective in operation and by means of which the car may be stopped within a short distance in case of emergency.

Figure 1:
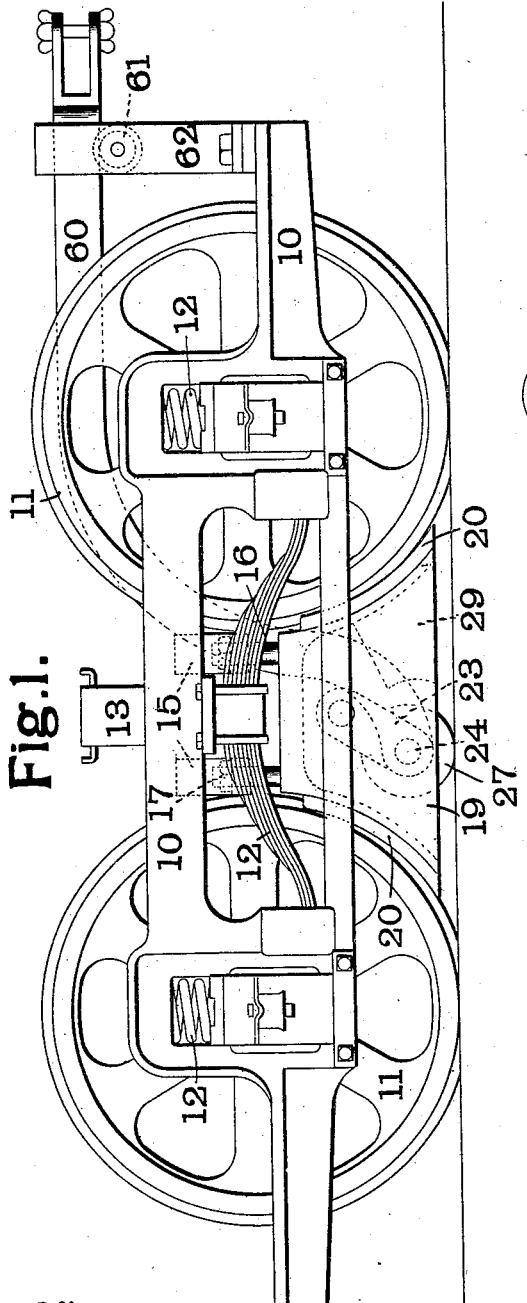
Figure 2:
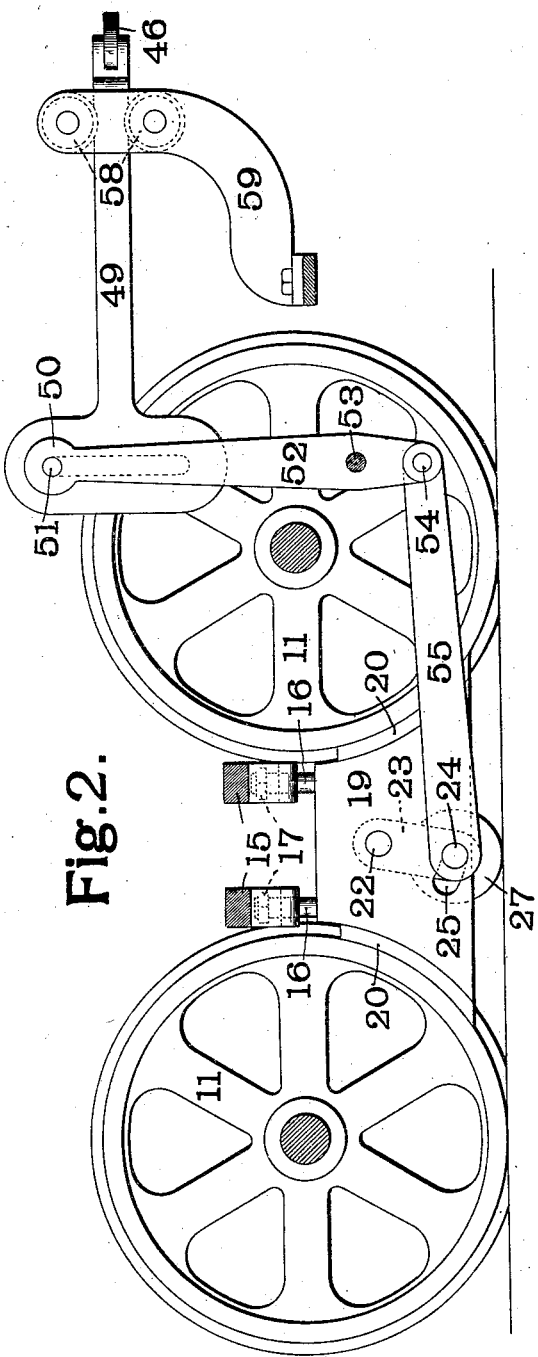

In the drawings forming part of this application, in which like characters of reference refer to similar parts in the different views, Figure 1 is a side elevation of a railway-truck having an embodiment of my invention applied thereto. Fig. 2 is a side elevation of the wheels and brake mechanism shown in Fig. 1, the end castings of the truck being sectioned away. Fig. 3 is a top plan view of my brake mechanism adapted for application of a double-truck car. Fig. 4 is a side elevation of the brake mechanism shown in Fig. 3. Fig. 5 is a detail view of the brake-block. Fig. 6 is a section on line 6 6 of Fig. 5. Fig. 7 is a vertical section showing the stop mechanism, and Fig. 8 is a horizontal section on line 8 8 of Fig. 7.

10 indicates the end castings, 11 the wheels, 12 the springs, and 13 the body-bolster, of a car-truck of any usual construction. A pair of guides 15 are carried at the inner side of the end castings 10. Two bolts 16, provided with nuts 17, are adapted to reciprocate in these guides and support the brake-block 19 between the wheels of the truck.

20 indicates brake-shoes keyed in the usual manner to the curved sides of the brake-block 19, as best shown in Fig. 5. The brake-lock 19 is hollow and in the space between its walls is carried the shaft 22. This shaft 22 carries a pair of hangers 23, in the lower ends of which the shaft 24 is journaled. This shaft passes through a segmental slot 25 in the side of the brake-block 19 and carries at its outer end a sleeve 26. Between the hangers 23 the shaft 24 carries a small wheel 27, which is adapted to make contact with the rail upon which the wheels of the truck rest, as shown in Figs. 1, 2, 4, and 5. The brake-block 19 is also provided with a solid portion 29, carrying a brake-shoe 30, so disposed as to be adapted to come in contact with the small wheel 27 when the same is actuated to set the brake, as hereinafter described.

Referring now to Figs. 2, 3, 4, and 5, 33 is the brake-staff, carrying a sprocket-wheel 34. A chain 35 passes over this sprocket-wheel and over a second sprocket-wheel 36, carried by a shaft 37, fastened to the car-body. The chain 35 is pivoted with a yoke 38, embracing one end of a bent lever 39, pivoted at 40 to the car. A rod 41 is pivoted to the other end of the bent lever 39 and also to one end of a lever 42. This lever 42 is centrally pivoted at 43 to the car-body. To this lever 42 are pivoted two rods 44 and 45, one at each side of the pivotal point 43. The other ends of these rods 44 and 45 are pivoted to rods 46 and 47, respectively. The ends of the rod 46 are pivoted to the rods 49, which terminate in yokes 50. Lugs 51 at the ends of levers 52 reciprocate in these yokes. The levers 52 are pivoted at 53 to the truck and at 54 to rods 55, which are connected at their other ends with the sleeves 26 upon the shafts 24. A similar train of mechanism, composed of rods 49, yokes 50, levers 52, and rods 55, connect the rod 47 with the wheels 27, carried by the brake-block on the remaining truck of the car. The yoke-bearing levers 49 are adapted to reciprocate, as hereinafter described, between a pair of rollers 58, mounted on an upward extension 59 of the car-truck, as shown in Fig. 2.

In Fig. 1 the wheel 27 is adapted to be operated by a single curved lever 60, the lower end of which is carried by the sleeve 26 on the shaft 24, Fig. 6, and the upper end of which is carried by a roller 61 on an upward extension 62 of the truck.

In Figs. 7 and 8 I have shown a stop mechanism which may be used in connection with my brake. Here, as before, 33 is the brake-staff, carrying the sprocket-wheel 34, the whole being mounted in the car-platform 65. A ratchet-wheel 66 is keyed upon the staff 35 at the lower side of the platform 65. 67 is a metallic casing let into the platform 65. This casing contains a pawl 68, having a slot 69, by means of which it is slidingly mounted upon a bolt 70, fastened in the casing 67. One end of this pawl coöperates with the ratchet-wheel 66 and its other end is connected by means of a spring 72 with an abutment 73. The pawl 68 is also provided with an upwardly-projecting lug 75, adapted to coöperate with notched end of a lever 76, pivoted at 77 to a pair of supports 78. The other end of this lever 76 projects through an opening in the top of the casing 67 and is provided with an enlargement 80. A spring 81 connects this end of the lever 76 with the abutment 73 and normally holds said lever in the position shown in Fig. 7. 83 is a pin passing through the top of the casing 67 and having its lower end resting upon the inner end of the lever 76.

In the operation of my invention the various parts of the brake are normally in the position shown in Figs. 3, 4, and 5. The hangers 23 are inclined in opposite directions on the two trucks, and the small wheels 27 are in contact with the rail, as shown in Fig. 4. It is evident that in this position of the parts the movement of the car in either direction will assist the operator in bringing the hangers 23 of one of the trucks to a substantially vertical position, as shown in Fig. 2, and that in the case of the remaining truck the movement of the car will resist the efforts of the operator to bring the hangers 23 to a vertical position, and consequently to bring the small wheel 27 directly beneath pivot 22 and force the brake-shoes into contact with the wheels of the truck. These two forces will neutralize each other and tend to reduce the amount of power necessary to set the brake. When the brake-staff 33 is rotated in a clockwise direction, the movement of the yoke 38 operates the lever 39, which in turn operates the lever 42 by means of the connecting-rod 41. The movement of the lever 42 pushes forward the rods 46 and 47 by means of the rods 44 and 45. This movement of the rods 46 and 47 operates the levers 52 by means of the yokes 50, as will be readily understood by an inspection of the position of the parts, as shown in Figs. 2, 4, and 5. The movement of the levers 52 will pull the small wheels 27 toward the middle of the car by means of the connecting-rods 55. This movement will bring the hangers 32 to substantially vertical positions and raise the brake-lock 19, bringing the brake-shoes 20 forcibly against the peripheries of the wheels. At the same time the small wheels 27 are brought into contact with the brake-shoes 30, thus braking the car.

By means of the stop mechanism shown in Figs. 7 and 8 the operator may check the movement of the parts of the brake and hold the same in any desired position. By pressing upon the pin 83 the notch in the end of the lever 76 is placed over the lug 75 on the pawl 68, thus holding the pawl firmly in engagement with the teeth of the ratchet-wheel 66 and locking the brake against further movement. When the pin 83 is released from pressure, the spring 81 draws the lever 76 away from the stop 75, and the brake may then be tightened or released.

When the hangers 23 are drawn inward to substantially vertical position, as above described, to brake the car, they tend to lift the weight of the car from the wheels 11 of the car-truck and to place its entire weight upon the small wheels 27. Therefore when the wheels 27 are brought into contact with the brake-shoes 30 the car will be stopped within a short distance and without sudden jar.

Having fully described my invention, what I claim as new, and desire to secure by Letters Patent of the United States, is—

1. The combination with a car-wheel of an upwardly-movable brake-shoe, a member carried by said brake-shoe and bearing upon the track, and means for actuating said member to move said brake-shoe upwardly into engagement with said wheel.

2. The combination with a car-wheel, of an upwardly-movable brake-shoe, a member pivoted to said brake-shoe and bearing upon the track, and means for actuating said member to move said brake-shoe upwardly into engagement with said wheel.

3. The combination with a car-wheel, of a brake-shoe, a rotary member carried by said brake-shoe and bearing upon the track, and means for actuating said rotary member to bring said brake-shoe into engagement with said wheel.

4. The combination with a pair of wheels on the same side of a car, of brake-shoes for said wheels, an upwardly-movable member connected with said brake-shoes and bearing upon the track, and means for actuating said member upwardly to move said brake-shoes into engagement with said wheels.

5. The combination with a car-wheel, of a vertically-reciprocating brake-shoe, a guide therefor, a member carried by said brake-shoe and bearing upon the track, and means for actuating said member to move said brake-shoe upwardly into engagement with said wheel.

6. The combination with the wheels and end casting of a car-truck, of a reciprocating brake-shoe, a guide for said brake-shoe carried by said end casting, a member carried by said brake-shoe and bearing against the track, and means for actuating said member to move said brake-shoe into engagement with one of said wheels.

7. The combination with a car-truck of a brake-shoe, a reciprocating wheel for actuating said brake-shoe, a stop, and means for moving said wheel into contact with said stop.

8. The combination with a car-truck, of a pivotally-mounted reciprocating wheel, a frictional stop carried by the car, and means for moving said wheel into contact with said stop.

9. The combination with a car-truck of a pivotally-mounted reciprocating wheel, a brake-shoe, and means for moving said wheel into contact with said brake-shoe.

10. The combination with a car-wheel of a brake-shoe, a rotary member carried by said brake-shoe and bearing against the track, a stop for said rotary member, and means for moving said rotary member into engagement with said stop and for actuating said brake-shoe.

11. The combination with a car-wheel, of a brake-shoe therefor, a second wheel carried by said brake-shoe and bearing against the track, a brake-shoe for said second wheel, and means for moving said brake-shoes and wheels into contact with one another.

12. The combination with the wheels of a car, of brake-shoes for said wheels, members carried by said brake-shoes and bearing against the track, and means for simultaneously actuating said members in opposite directions to operate said brake-shoes.

13. The combination with the wheels of a car, of brake-shoes for said wheels, members pivotally attached to said brake-shoes, and means for actuating said members to bring said brake-shoes into engagement with said wheels, one of said members being adapted to bear against the track forward of its pivotal point and the other of said members being adapted to bear against the track at the rear of its pivotal point.

14. The combination with the wheels of a car, of brake-shoes for said wheels, reciprocating members carried by said brake-shoes, and bearing against the track, means for forwardly actuating one of said reciprocating members to operate one of said brake-shoes, and means for rearwardly actuating another of said reciprocating members to operate another of said brake-shoes.

15. The combination with the wheels of a car, of brake-shoes for said wheels, members carried by said brake-shoes and bearing against the track, means for simultaneously actuating said members in opposite directions to operate said brake-shoes, and a stop for limiting the movement of said members.

In testimony whereof I have hereunto set my hand and affixed my seal in the presence of the two subscribing witnesses.

WILLIAM H. WENDELER. [L. S.]

Witnesses:
JAMES H. BRYSON,
W. A. ALEXANDER.